(12) United States Patent
McKay et al.

US010392939B2

(10) Patent No.: US 10,392,939 B2
(45) Date of Patent: Aug. 27, 2019

(54) GAS TURBINE ARRANGEMENT

(71) Applicants: ROLLS-ROYCE PLC, London (GB); ROLLS-ROYCE DEUTSCHLAND LTD & CO, Dahlewitz (DE)

(72) Inventors: Andrew McKay, Derby (GB); Miklos Gäbler, Dahlewitz (DE)

(73) Assignees: ROLLS-ROYCE plc, London (GB); ROLLS-ROYCE DEUTSCHLAND LTD & CO, Blankenfelde-Mahlow (DE)

( * ) Notice: Subject to any disclaimer, the term of this patent is extended or adjusted under 35 U.S.C. 154(b) by 469 days.

(21) Appl. No.: 15/174,777

(22) Filed: Jun. 6, 2016

(65) Prior Publication Data

US 2016/0363171 A1 Dec. 15, 2016

(30) Foreign Application Priority Data

Jun. 12, 2015 (GB) .................................... 1510256.9

(51) Int. Cl.
| | |
|---|---|
| *F01D 5/02* | (2006.01) |
| *F02C 7/36* | (2006.01) |
| *F16D 1/10* | (2006.01) |
| *F16D 1/06* | (2006.01) |

(52) U.S. Cl.
CPC ............... *F01D 5/026* (2013.01); *F02C 7/36* (2013.01); *F05D 2240/61* (2013.01); *F16D 1/06* (2013.01); *F16D 2001/103* (2013.01)

(58) Field of Classification Search
CPC ... F16D 1/033; F16D 1/02; F16D 1/06; F16D 2001/103; F01D 5/026; F02C 7/36; F16C 3/02; F05D 2240/61; F04D 29/054
See application file for complete search history.

(56) References Cited

U.S. PATENT DOCUMENTS

| | | | |
|---|---|---|---|
| 3,602,535 A | 8/1971 | Behning et al. | |
| 3,952,391 A * | 4/1976 | Gee ........................ | B23P 15/02 29/889.2 |
| 3,997,962 A | 12/1976 | Kleitz et al. | |

(Continued)

FOREIGN PATENT DOCUMENTS

| | | |
|---|---|---|
| GB | 708018 A | 4/1954 |
| GB | 926947 A | 5/1963 |

(Continued)

OTHER PUBLICATIONS

Dec. 14, 2015 Great Britain Search Report issued in Great Britain Application No. 1510256.9.

(Continued)

*Primary Examiner* — Richard A Edgar
(74) *Attorney, Agent, or Firm* — Oliff PLC

(57) ABSTRACT

A gas turbine drive shaft arrangement, comprising: a hollow compressor drive shaft, a first hollow turbine drive shaft for driving a first turbine stage and a second hollow turbine drive shaft for driving a second turbine stage, wherein the compressor drive shaft has a spline on an internal surface that is meshed with a spline on an external surface of the first hollow turbine drive shaft, the first turbine drive shaft further comprising a spline on an internal surface thereof that is meshed with a spline on an external surface of the second hollow turbine drive shaft.

15 Claims, 4 Drawing Sheets

(56) References Cited

U.S. PATENT DOCUMENTS

| | | | | |
|---|---|---|---|---|
| 4,901,523 A | * | 2/1990 | Huelster | F01D 5/026 |
| | | | | 416/198 A |
| 4,973,221 A | * | 11/1990 | Anderson | F01D 25/04 |
| | | | | 188/379 |
| 5,580,183 A | * | 12/1996 | Brackoneski | F01D 5/026 |
| | | | | 403/24 |
| 6,338,578 B1 | | 1/2002 | Adde et al. | |
| 2013/0323077 A1 | * | 12/2013 | Giannakopoulos | F01D 5/025 |
| | | | | 416/93 R |

FOREIGN PATENT DOCUMENTS

| | | |
|---|---|---|
| GB | 2464182 A | 4/2010 |
| WO | 95/30098 A1 | 11/1995 |

OTHER PUBLICATIONS

Nov. 10, 2016 European Search Report issued in European Patent Application No. 16172903.

* cited by examiner (Known Art)

GAS TURBINE ARRANGEMENT

The invention relates to joints between shafts in a gas turbine and particularly splined joints that transfer load from a turbine to a compressor.

In a gas turbine engine joints between shafts are often located in areas of the engine that are subject to adverse conditions such as high temperature. The joints are also subject to high torque loads. Some engine architectures require multiple turbine stages to drive the compressor.

Figure 4:
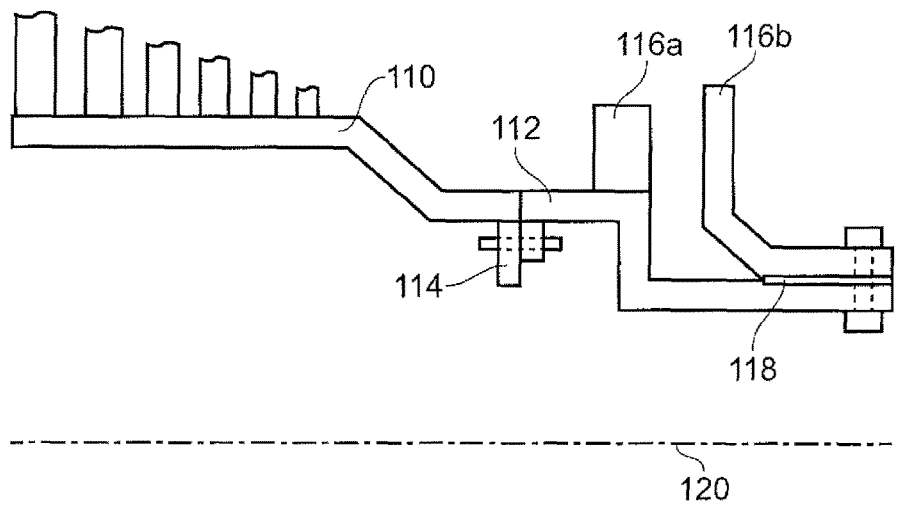

A schematic view of a joint between the compressor, first turbine stage 16a and second turbine stage 16b of a known gas turbine engine is shown in FIG. 4. The compressor shaft 110 is joined to a first turbine shaft 112 through a bolted flange 114 the second turbine stage 116b is connected to the first turbine stage 116a through a splined arrangement 118. The flange 114 is annular and extends circumferentially around the engine axis 120. The bolts are located radially inside the shafts to isolate them from the heat of the combustion chamber 122 which can be significant and limit the life of the joint. The flange determines in part the spacing of the compressor shaft from the axis of the engine that means that the compressor shaft diameter is large, which increases the mass of the shaft and the centrifugal forces acting on it. The multiple bolts required at each joint 114 take assembly time and add to the weight of the arrangement. The large part count also increase the risk that one or more of the bolts may work loose in operation and become released into the engine.

It is an object of the present invention to seek to provide an improved joint between shafts.

According to a first aspect there is provided a gas turbine drive shaft arrangement, comprising: a hollow compressor drive shaft, a first hollow turbine drive shaft for driving a first turbine stage and a second hollow turbine drive shaft for driving a second turbine stage, wherein the compressor drive shaft has a spline on an internal surface that is meshed with a spline on an external surface of the first hollow turbine drive shaft, the first turbine drive shaft further comprising a spline on an internal surface thereof that is meshed with a spline on an external surface of the second hollow turbine drive shaft.

The first turbine shaft may have a flange extending from an exterior surface thereof, the annular flange defining an annular cavity that holds an end of the compressor shaft. The cavity may have a constant or tapering cross-section as it extends axially rearwardly.

A projection, flange or spigot may extend from a radially inner surface of the compressor shaft and abuts a radially outer surface portion of the second turbine shaft. The projection may be annular.

The projection may be secured between two locknuts threadingly mounted to the second turbine shaft.

The second turbine drive shaft may have a continuous shoulder between a first outer surface portion and a second outer surface portion the diameter of the first outer surface portion being radially inside the second outer surface portion, the first turbine drive shaft having a continuous shoulder between a first inner surface portion and a second inner surface portion the diameter of the first inner surface portion being radially inside the second inner surface portion, One of the two locknuts may abut an end face of the first turbine drive shaft to inhibit axial movement between the first and second turbine drive shafts.

The continuous shoulder of the first turbine drive shaft may abut the continuous shoulder of the second turbine drive shaft.

According to a second aspect there is provided a gas turbine drive shaft arrangement comprising: a first hollow turbine drive shaft for driving a first turbine stage and a second hollow turbine drive shaft for driving a second turbine stage, wherein the first turbine drive shaft comprising a spline on an internal surface thereof that is meshed with a spline on an external surface of the second hollow turbine drive shaft, wherein the second turbine drive shaft has a continuous shoulder between a first outer surface portion and a second outer surface portion the diameter of the first outer surface portion being radially inside the second outer surface portion, the first turbine drive shaft having a continuous shoulder between a first inner surface portion and a second inner surface portion the diameter of the first inner surface portion being radially inside the second inner surface portion.

The continuous shoulder of the first turbine drive shaft may abut the continuous shoulder of the second turbine drive shaft.

The continuous shoulder of the first turbine drive shaft may abut the continuous shoulder of the second turbine drive shaft.

The first turbine shaft may have a flange extending from an exterior surface thereof, the annular flange defining an annular cavity that holds an end of the compressor shaft.

The skilled person will appreciate that except where mutually exclusive, a feature described in relation to any one of the above aspects of the invention may be applied mutatis mutandis to any other aspect of the invention.

Figure 1:
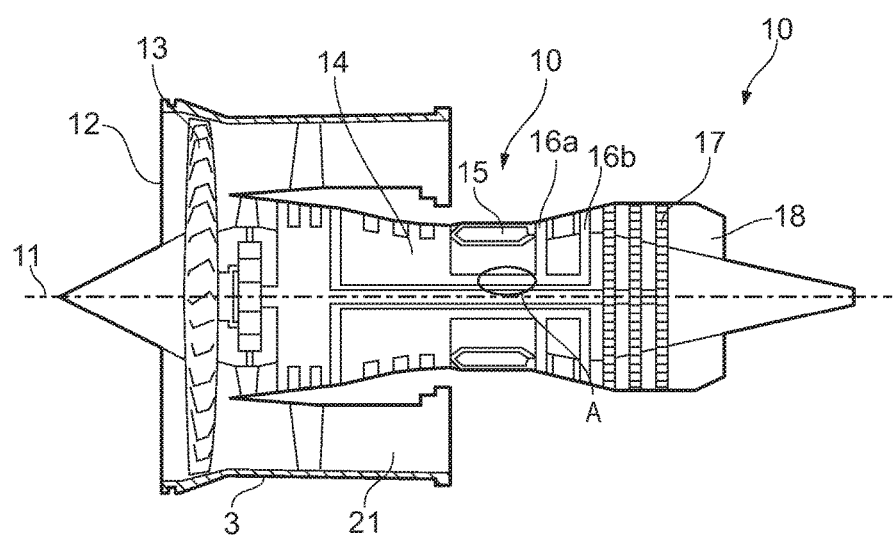
Figure 2:
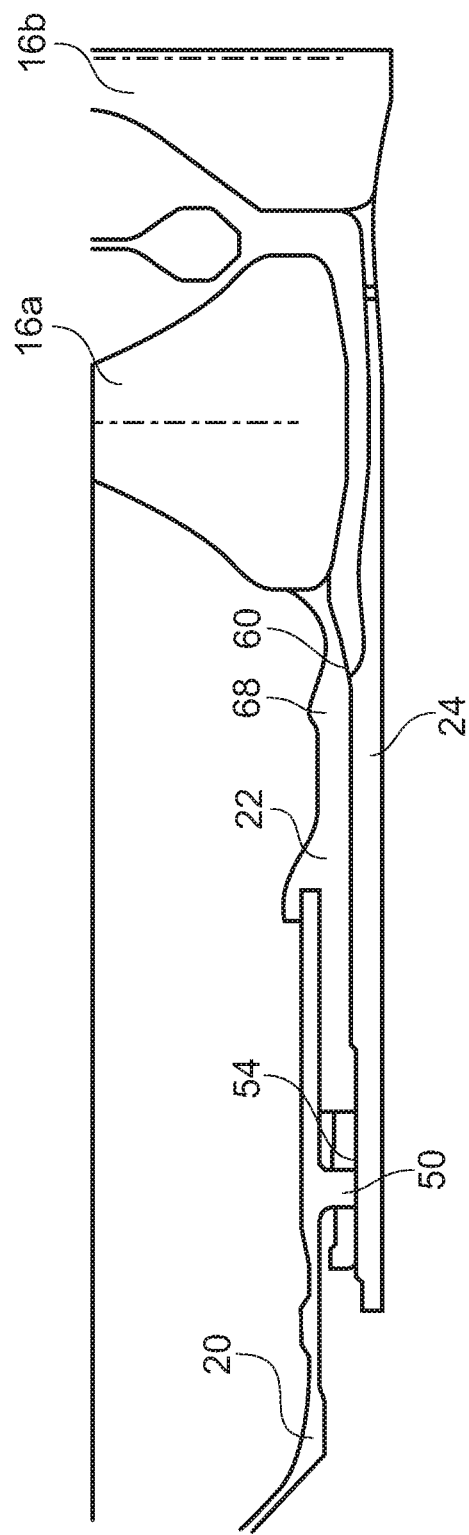
Figure 3:
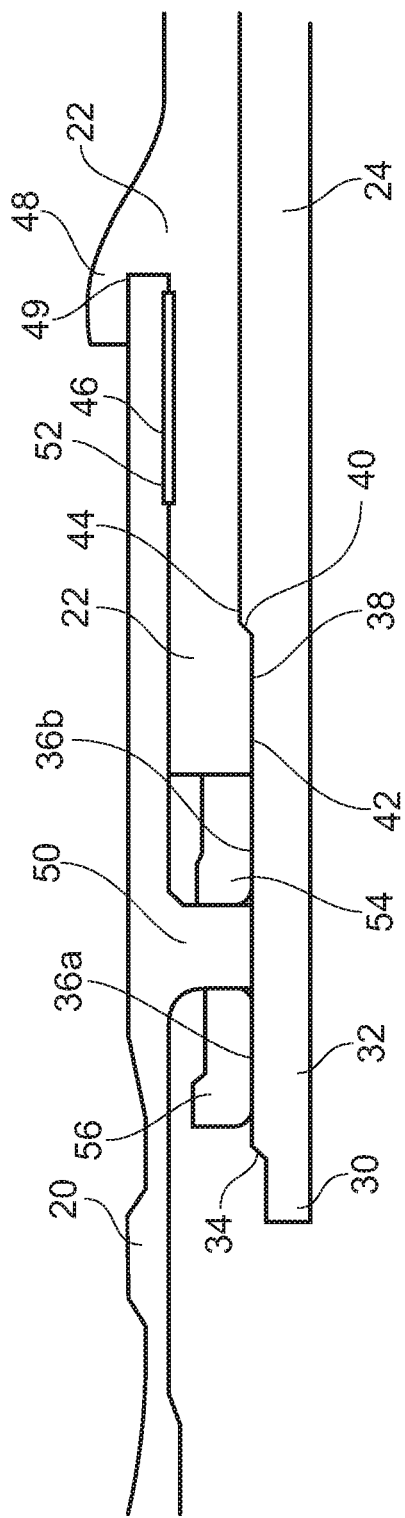

Embodiments of the invention will now be described by way of example only, with reference to the Figures, in which:

FIG. 1 is a sectional side view of a gas turbine engine;
FIG. 2 is a sectional side view of a splined shaft joint;
FIG. 3 is a closer view of the splined shaft join of FIG. 2;
FIG. 4 is a view of a conventional gas turbine engine.

With reference to FIG. 1, a gas turbine engine is generally indicated at 10, having a principal and rotational axis 11. The engine 10 comprises, in axial flow series, an air intake 12, a propulsive fan 13, a high-pressure compressor 14, combustion equipment 15, a high-pressure turbine 16, a low-pressure turbine 17 and an exhaust nozzle 18. A nacelle 3 generally surrounds the engine 10 and defines the intake 12. All references to axially forward and axially rearward are with reference to the engine axis.

The gas turbine engine 10 works in the conventional manner so that air entering the intake 12 is accelerated by the fan 13 to produce two air flows: a first air flow into the high-pressure compressor 14 and a second air flow which passes through a bypass duct 21 to provide propulsive thrust. The high-pressure compressor 14 compresses the air flow directed into it before delivering that air to the combustion equipment 15.

In the combustion equipment 15 the air flow is mixed with fuel and the mixture combusted. The resultant hot combustion products then expand through, and thereby drive the high and low-pressure turbines 16, 17 before being exhausted through the nozzle 18 to provide additional propulsive thrust. The high 16 and low 17 pressure turbines drive respectively the high pressure compressor 14 and the fan 13, each by suitable interconnecting shaft.

The interconnecting shaft between the high pressure turbine and the high pressure compressor is formed in multiple parts connected through a splined joint. This joint is shown in more detail in FIGS. 2 and 3.

The high pressure turbine has multiple stages each with an output shaft that extends axially forward of the turbine stage.

The compressor shaft 20, a first turbine shaft 22 and a second turbine shaft 24 are connected at a single joint location within the engine that is adjacent the turbine stages to minimise the length of each of the first and second turbine shafts. This position is marked by circle "A" in FIG. 1. Each of the shafts has a spline that engages with a spline on an adjacent shaft and each shaft has a different diameter, with the shaft 24 to the second turbine stage 16b having the smallest diameter, the shaft 22 to the first turbine stage 16a having an intermediate diameter and the shaft 20 to the compressor stage 14 having the greatest diameter at the spline joint.

The hollow shaft to the second turbine stage has a constant internal diameter but a radial thickness that varies along its axial length. This is shown in more detail in FIG. 3. At its axial forward end there is a thinner portion 30 with a constant first thickness that after a length thickens to a second thickness 32. The transition 34 between the first and second thickness is at a constant rate to aid manufacturability and the thinner portion aids assembly by providing a lead in for a locknut.

The second thickness has two regions of screw threads 36a, 36b on its radially outer surface for securing respective locknuts. The two regions are separated by a portion against which a spigot 50 from the compressor shaft 20 may be located to be secured between the respective locknuts. The screw threads may be formed in the same or opposing directions but preferably are formed to prevent unwind of the locknuts during operation of the engine.

Splines 38 are formed in the radially outer surface of the second turbine shaft axially rearward of the screw threads. Although axial splines may be used it is preferable to use helical splines that serve to better share load transfer.

The radial thickness expands downstream of the splines to provide a shoulder 40 in the transition to a third radial thickness. The shoulder is sloped rather than stepped which allows the splines to continue into the region of the shoulder.

The hollow shaft 22 to the first turbine stage has a profiled inner surface and a profiled outer surface. Both surfaces have regions having splines. At the axially forward end of the shaft, on the radially inner surface, there are a series of splines 42 that are configured to engage with the splines on the radially outer surface of the hollow shaft. The spline is formed on the radially inner surface of the shaft 22 through conventional manufacturing methods. The splines are complementary to the splines on the outer surface of the shaft to the second turbine stage.

The internal bore has a profile that has a radial diameter that increases to provide a shoulder 44 that is configured to engage the shoulder provided by the increased thickness of the shaft to the second turbine. The profile of the internal bore accommodates the shaft to the second turbine stage such that there is contact along a significant, substantial and/or majority of the length of an axial overlap of the shaft to the first turbine stage and the shaft to the second turbine stage.

The outer surface of the shaft to the first turbine stage has a second spline arrangement 46 on its radially outer surface for connection to a corresponding spline 52 on the radially inner surface of the compressor shaft 20. These splines may extend axially, or helically as may be required for the optimum connection.

Downstream of the spline on the radially outer surface of the shaft to the first turbine stage there is provided a local thickening 48 which is configured to provide an annular cavity 49, that may be cylindrical or conical and that is open at its axially forward end and which can receive the downstream end of the compressor shaft. The radial width of the cavity being selected to simultaneously radially constrain a portion of both the inner surface and the outer surface of shaft to the compressor. The cavity has an axial length of sufficient length that the compressor shaft does not extend right to the end. This ensures that the compressor shaft is axially constrained by locknuts acting on the spigot 50 rather than the end of the axial cavity.

The hollow compressor shaft 20 is open at its axially rearward end and has a radially inwardly extending flange 50 on its radially inner surface. The length of the flange configured to be sufficient to extend across the gap between the radially inner surface of the compressor shaft and the radially outer surface of the shaft 24 to the second turbine stage so that the flange abuts the radially outer surface of the shaft to the second turbine stage and acts as a radial location feature for the compressor shaft.

The flange is located axially forward of a splined region 52 on the radially inner surface of the compressor shaft and which is configured to engage the splined region on the outer surface of the shaft to the first turbine stage.

The assembly and assembled splined joint will now be described in more detail.

Firstly the two turbine shafts are assembled by inserting the shaft 24 to the second turbine stage into the hollow bore of the shaft 22 to the first turbine stage. The second stage turbine shaft is input from the rear and moved axially till the spline on its outer surface 38 engages the spline 42 on the inner surface of the first turbine stage shaft. If the splines are helically arranged either or both of the first or second shafts may need to be rotated about their longitudinal axes to ensure complete engagement of the splines.

The profile of the inner surface of the first turbine stage shaft and shoulder on the second turbine stage shaft abut to limit the relative axial movement of the two shafts. The radial outer surface of the second stage shaft the radially inner surface of the first stage shaft abut for a significant portion of their length where they overlap to limit their relative radial movement.

As shown in FIG. 2, at a suitable location 60, the radially inner surface of the first turbine shaft and the radially outer surface of the second turbine shaft may diverge either by changing the diameter or thickness of one or both shafts to enable the shaft to the second stage to pass the cob of the first turbine stage 16a.

Rearward of the spline joint the diameter and/or thickness 68 of the shaft to the first turbine stage may be varied to ensure the drive is accurately transmitted from the turbine to the spline joint.

A locknut 54 is threaded onto the outer surface of the shaft to the second turbine stage to secure the two shafts together as a unit and to inhibit relative axial movement and potential separation of the two shafts.

The turbine unit is subsequently secured to the compressor shaft by inserting a portion of the unit into the hollow bore of the compressor shaft. The insertion is to an axial point where the flange 50 of the compressor shaft abuts an axially forward side of the locknut 54 which secures the two turbine shafts together. The axially rearward end of the compressor shaft is inserted into the annular cavity provided on the outer surface of the first turbine shaft.

The splines on the radially inner surface of the compressor shaft and the radially outer surface of the first turbine shaft are engaged. The end of the compressor shaft does not abut the axially rearward face of the annular cavity such that that the relative axial location of the turbine unit and the compressor shaft is determined by the location of the flange and the locknut.

The flange, in combination with the radially inner surface of the compressor shaft abutting the radially outer surface of the shaft to the first turbine stage, and in combination with the radially outer surface of the compressor shaft abutting the inner surface of the cavity 28 to ensure that the shafts are aligned without requiring the cost and complexity of using additional bearings. The structure is also resistant to bending moments and ensures the splines remain engaged at all times whilst being driven.

A second locknut 56 is inserted into the compressor shaft and the joined turbine shafts inserted before the locknut is tightened to capture the flange 30 between the two locknuts and the end of the compressor shaft in the cavity at the outside of the shaft to the first turbine stage.

It will be appreciated that the spline joint is axially and radially compact and has a low part count when compared with earlier configurations. The arrangement advantageously allows greater radial freedom to the join allowing it to be located closer to the axis of the engine and further away from the combustor where high temperature may increase the risk of fatigue of the components. The overall weight of the joint is reduced over conventional assemblies and this may improve the efficiency of the engine resulting in reduced fuel burn and the generation of environmentally harmful emissions. Furthermore the whole engine mechanical behaviour can be tuned hence the rotor system stiffness can be adjusted in a way to allow more favourable rotor frequency conditions.

The join design helps with the development of smaller engine applications and opens up a different design space that may not be available by known technologies.

The use of multiple axially spaced spigot joints help to ensure shaft straightness across the joint which reduces the need for additional support bearings.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, the terms first and second turbine stages have been used but this could relate to their axial location rather than their numerical position. i.e. several turbine stages may be grouped within the first stage, and/or several turbine stages may be grouped within the second stage. Also, other turbine stages upstream of the first turbine stage may drive other shafts (not shown).

The invention also finds application where three or more components are joined with each component having an axially extending shaft or flange that can be arranged coaxially. Such components may be rotor or disc sections that join together to form, for example, a turbine or compressor.

The invention claimed is:

1. A gas turbine drive shaft arrangement, comprising:
   a hollow compressor drive shaft,
   a first hollow turbine drive shaft for transferring torque from a first turbine stage and a second hollow turbine drive shaft for transferring torque from a second turbine stage, wherein the hollow compressor drive shaft has a spline on an internal surface that is meshed with a spline on an external surface of the first hollow turbine drive shaft, the first turbine drive shaft further comprising a spline on an internal surface thereof that is meshed with a spline on an external surface of the second hollow turbine drive shaft, wherein
   the first hollow turbine shaft has a thickened portion with an annular flange extending from an exterior surface thereof, the annular flange defining an annular cavity that holds an end of the hollow compressor drive shaft.

2. A gas turbine drive shaft arrangement according to claim 1, wherein a projection extends from a radially inner surface of the compressor shaft and abuts a radially outer surface portion of the second hollow turbine shaft.

3. A gas turbine drive shaft arrangement according to claim 2, wherein the projection is annular.

4. A gas turbine drive shaft arrangement according to claim 2, wherein the projection is secured between two locknuts threadingly mounted to the second hollow turbine shaft.

5. A gas turbine drive shaft arrangement according to claim 4, wherein the second hollow turbine drive shaft has a continuous shoulder between a first outer surface portion and a second outer surface portion, the diameter of the first outer surface portion being radially inside the second outer surface portion, the first turbine drive shaft having a continuous shoulder between a first inner surface portion and a second inner surface portion the diameter of the first inner surface portion being radially inside the second inner surface portion, and wherein one of the two locknuts abuts an end face of the first turbine drive shaft to inhibit axial movement between the first and second hollow turbine drive shafts.

6. A gas turbine drive shaft arrangement according to claim 5, wherein the continuous shoulder of the first hollow turbine drive shaft abuts the continuous shoulder of the second hollow turbine drive shaft.

7. A gas turbine drive shaft arrangement, according to claim 1, wherein the second hollow turbine drive shaft has a continuous shoulder between a first outer surface portion and a second outer surface portion, the diameter of the first outer surface portion being radially inside the second outer surface portion, the first hollow turbine drive shaft having a continuous shoulder between a first inner surface portion and a second inner surface portion the diameter of the first inner surface portion being radially inside the second inner surface portion.

8. A gas turbine drive shaft according to claim 1, wherein the hollow compressor drive shaft, the first hollow turbine drive shaft for transferring torque from a first turbine stage and the second hollow turbine drive shaft are coaxial and overlap over at a portion of their length.

9. A gas turbine drive shaft arrangement comprising:
   a first hollow turbine drive shaft for transferring torque from a first turbine stage and a second hollow turbine drive shaft for transferring torque from a second turbine stage, wherein
   the first hollow turbine drive shaft comprising a spline on an internal surface thereof that is meshed with a spline on an external surface of the second hollow turbine drive shaft,
   the second hollow turbine drive shaft has a continuous shoulder, adjacent to the first spline, that is sloped between a first outer surface portion and a second outer surface portion the diameter of the first outer surface portion being radially inside the second outer surface portion, the first turbine drive shaft having a continuous shoulder, adjacent to the first spline, that is sloped between a first inner surface portion and a second inner surface portion, and the diameter of the first inner surface portion being radially inside the diameter of the second inner surface portion, wherein the first hollow turbine shaft has a thickened portion with an annular flange extending from an exterior surface thereof, the annular flange defining an annular cavity that holds an end of a compressor shaft.

10. A gas turbine drive shaft arrangement according to claim 9, wherein the continuous shoulder of the first hollow turbine drive shaft abuts the continuous shoulder of the second hollow turbine drive shaft.

11. A gas turbine drive shaft arrangement, comprising:
a hollow compressor drive shaft,
a first hollow turbine drive shaft for transferring torque from a first turbine stage and a second hollow turbine drive shaft for transferring torque from a second turbine stage, wherein the hollow compressor drive shaft has a spline on an internal surface that is meshed with a spline on an external surface of the first hollow turbine drive shaft, the first turbine drive shaft further comprising a spline on an internal surface thereof that is meshed with a spline on an external surface of the second hollow turbine drive shaft, wherein a projection extends from a radially inner surface of the compressor shaft and abuts a radially outer surface portion of the second hollow turbine shaft.

12. A gas turbine drive shaft arrangement according to claim 11, wherein the projection is annular.

13. A gas turbine drive shaft arrangement according to claim 11, wherein the projection is secured between two locknuts threadingly mounted to the second hollow turbine shaft.

14. A gas turbine drive shaft arrangement according to claim 13, wherein the second hollow turbine drive shaft has a continuous shoulder between a first outer surface portion and a second outer surface portion, the diameter of the first outer surface portion being radially inside the second outer surface portion, the first turbine drive shaft having a continuous shoulder between a first inner surface portion and a second inner surface portion the diameter of the first inner surface portion being radially inside the second inner surface portion, and wherein one of the two locknuts abuts an end face of the first turbine drive shaft to inhibit axial movement between the first and second hollow turbine drive shafts.

15. A gas turbine drive shaft arrangement according to claim 14, wherein the continuous shoulder of the first hollow turbine drive shaft abuts the continuous shoulder of the second hollow turbine drive shaft.

* * * * *